United States Patent Office 2,943,114
Patented June 28, 1960

2,943,114
MANUFACTURE OF DICHLOROBENZENES

Horace E. Redman and Paul E. Weimer, Baton Rouge, La., assignors to Ethyl Corporation, New York, N.Y., a corporation of Delaware No Drawing. Original application Oct. 14, 1954, Ser. No. 462,368. Divided and this application Sept. 26, 1958, Ser. No. 769,965

2 Claims. (Cl. 260—650)

This invention relates to the production of dichlorobenzenes and, more particularly, to a new and improved method for the manufacture of 1,3-dichlorobenzene.

1,3-dichlorobenzene has great utility as an intermediate in the preparation of herbicides, pesticides, dyes and the like. Although there are numerous present and potential uses of 1,3-dichlorobenzene, its commercial application has been restricted in a large degree due to its high cost which results from the complex and costly process operations required for its manufacture. This particular isomer of dichlorobenzene can not be prepared commercially by the chlorination of benzene since it is obtained as only an extremely small fraction of the total dichlorobenzenes thus formed, normally not more than one percent. One common method of its manufacture is by the diazotization of metachloroaniline followed by a Sandmeyer reaction. Here again the yields are quite low and the process operations are complex and costly.

It is, accordingly, an object of this invention to provide an improved process for the manufacture of 1,3-dichlorobenzene. Another object of this invention is to provide a process in which 1,3-dichlorobenzene can be manufactured from higher chlorinated benzenes, particularly the trichlorobenzenes. Still another object is to provide a process of the above type which can be combined with a chlorination operation to produce essentially quantitative yields of 1,3-dichlorobenzene from any dichloro- or trichlorobenzene feed material. Other objects and advantages of this invention will be apparent from the following description and appended claims.

It has now been found that 1,3-dichlorobenzene can be produced in exceptionally high proportions relative to its co-present isomers by reacting trichlorobenzene or a higher chlorinated benzene with hydrogen at elevated temperatures and in the presence of certain hydrogenolysis catalysts. The process can employ any of the three trichlorobenzene isomers and all of these isomers produce an isomeric mixture of dichlorobenzenes which unexpectedly contain large proportions, i.e. 15 percent and over, of the desirable 1,3-dichlorobenzene isomer. This is a substantial and unexpected improvement over the dichlorobenzene isomer distribution, i.e. normally less than one percent, obtained by prior processes.

In general, the process comprises contacting hydrogen and trichlorobenzene in the proportions of between about 0.5:1 to 2:1 respectively, with a suitable hydrogenolysis catalyst at a temperature of above about 300° C. The reaction products are collected and fractionated by suitable well-known means, such as distillation or crystallization, to recover the dichlorobenzenes.

If desired, all or a large fraction of the trichlorobenzene feed can be converted to the desired dichlorobenzene. In practice it is preferred to convert only a fraction, i.e. between about 20 to 60 percent, of the feed per pass through the reactor, separating the unconverted fraction for recycle, with additional fresh trichlorobenzene feed and hydrogen.

The hydrogenolysis catalysts useful in accordance with the present invention are metals of groups I, VI and VIII of the periodic table. The term "metal" as used in the claims includes metals in metallic form or their salts or oxides. Typical examples of metals which are effective for this purpose are platinum, palladium, molybdenum, tungsten, copper, silver, chromium, cobalt and nickel. Also, compounds such as copper chromite and nickel oxide are extremely effective. It is preferred to utilize the catalysts on a carrier such as activated carbon, silica gel, kieselguhr, alumina and natural clays which are known catalyst carriers.

The temperature for the conversion of the trichlorobenzene to dichlorobenzene is not critical, although materially improved results are obtained at temperatures above about 300° C. and preferably above about 350° C. With most of the catalysts the reaction is very active at temperatures around 400° C. The upper temperature limit is not important, although excessively high temperatures tend to crack the polychlorobenzenes and, in general, the temperature should be maintained below about 600° C. At these temperatures the reaction is generally carried out in the vapor state, which conditions have been found to give better yields than liquid phase operation.

The pressure of the hydrogenolysis operation is not particularly critical. Normally, it is preferred to employ atmospheric pressure or sub-atmospheric pressure. Super-atmospheric pressure can be used, although there is a tendency to liquefy the reactants, giving inferior results under many circumstances.

The process can be carried out using either batch or continuous procedures. However, since vapor phase operation is desirable and in view of the well-known advantages inherent in a continuous process, the latter is generally preferred.

In general, the hydrogen is fed to the hydrogenolysis operation in a mole ratio of between about 0.3:1 to about 2.0:1, although ratios of 0.5:1.0 to 1.0:1.0 are preferred. Higher concentrations of hydrogen can be employed, although these excess quantities tend to result in the formation of a product containing compounds having an excessively low chlorine content (less than 2 chlorine atoms). Lower concentrations of hydrogen result in the necessity of recycling excessive quantities of the trichlorobenzene through the hydrogenolysis operation. When appreciable quantities of the higher chlorinated benzenes, i.e. tetrachlorobenzene and higher, are present in the feed, it is generally desirable to employ a proportionately higher hydrogen to polychlorobenzene mole ratio in order to obtain the dichlorobenzenes.

The following examples are given to more fully illustrate the benefits of the present invention, but are not intended to limit the same. In each of these examples, the quantities are only for a single pass through the reactor and it should be understood that it is preferred to strip off the dichlorobenzenes and lower chlorinated benzenes and recycle the unreacted fraction for further reaction. Using this procedure, essentially complete conversion of the feed to dichlorobenzene can be obtained. The quantities given are in parts by weight.

Example 1

Trichlorobenzene (701 parts) was passed through a tubular reactor maintained at about 408° C. and containing 245 parts of a catalyst consisting of 5.0 percent of cuprous chloride and 95 percent of titanium dioxide. Hydrogen was continuously fed to the reactor at a mole ratio of hydrogen to trichlorobenzene of about 0.55:1. The reaction was carried out for seven hours during which time 4.69 parts of hydrogen was fed into the reactor. During this time a total of 55.9 parts of hydrogen chloride were recovered and the hydrogen conversion was 76.5 percent. The initial trichlorobenzene feed had the following composition in parts by weight:

1,2,4-trichlorobenzene _____ 98.5
1,2,3-trichlorobenzene _____ 1.5

The organic product recovered from the reaction amounted to 636 parts and had the following composition:

| | Mole percent |
|---|---|
| Benzene | 0.8 |
| Monochlorobenzene | 5.1 |
| 1,2-dichlorobenzene | 10.5 |
| 1,3-dichlorobenzene | 11.5 |
| 1,4-dichlorobenzene | 2.7 |
| 1,2,3-trichlorobenzene | 0.4 |
| 1,2,4-trichlorobenzene | 69.0 |

It can be seen that about 24.7 percent of the trichlorobenzene feed has been converted to the three dichlorobenzene isomers, of which the 1,3-isomer constitutes about 46.5 percent. The proportion of 1,3-dichlorobenzene isomer obtained herein is a tremendous increase over the fraction of one percent, which is the proportion usually obtained by the chlorination of benzene route.

*Example II*

The procedure of Example I is repeated except that the catalyst was changed and the reaction period was 28 hours. The catalyst (549 parts) used in this example consisted of 36 percent by weight cupric oxide, 50 percent chromia, and 8 percent silicon dioxide. The trichlorobenzene feed (3053 parts) was passed into the reactor along with 33.6 parts of hydrogen (a hydrogen to trichlorobenzene feed ratio of 1:1). At a reactor temperature of 400° C. the average conversion was 82.9 percent based on the hydrogen feed. The trichlorobenzene feed had the same composition as in Example I and the reaction produced 2683 parts of an organic product which had the following composition:

| | Mole percent |
|---|---|
| Benzene | 7.1 |
| Monochlorobenzene | 17.6 |
| 1,2-dichlorobenzene | 13.8 |
| 1,3-dichlorobenzene | 10.8 |
| 1,4-dichlorobenzene | 9.1 |
| 1,2,3-trichlorobenzene | 0.0 |
| 1,2,4-trichlorobenzene | 41.6 |

It should be noted that over 33 percent of the trichlorobenzene feed was converted to the dichlorobenzene product of which the 1,3-dichlorobenzene isomer is present to the extent of 32 percent. Here again the proportion of the 1,3-dichlorobenzene isomer in the isomeric mixture is substantially greater than would have been possible via the chlorination of benzene route.

*Example III*

Example II is repeated except that the temperature is maintained at about 350° C. The conversion based upon the hydrogen feed was 43.1 percent and the isomeric distribution of the dichlorobenzenes remained essentially the same. These results are illustrative of the effect of temperature on the reaction rates and resultant degree of conversion.

*Example IV*

Example II was repeated except that the reaction temperature was maintained at 416° C. for 17 hours. In this example 405 parts of a catalyst containing 44.0 percent nickel on kieselguhr was employed. The trichlorobenzene feed (1907 parts) had the same composition as employed in the previous examples. The hydrogen to trichlorobenzene feed ratio was maintained at 1:1 and a total of 20.8 parts of hydrogen was fed to the reactor. An average conversion of 53.1 percent based on the hydrogen feed was obtained. The reaction produced 1376 parts of an organic product having the following composition:

| | Mole percent |
|---|---|
| Benzene | 2.9 |
| Monochlorobenzene | 12.6 |
| 1,2-dichlorobenzene | 8.7 |
| 1,3-dichlorobenzene | 10.0 |
| 1,4-dichlorobenzene | 10.2 |
| 1,2,3-trichlorobenzene | 0.7 |
| 1,2,4-trichlorobenzene | 54.9 |

Here again it can be seen that about 29 percent of the trichlorobenzene feed has been converted to a dichlorobenzene isomeric mixture of which more than 37 percent is the desirable 1,3-dichlorobenzene isomer.

*Example V*

When the procedure of Example I was repeated, this time using 0.5 percent platinum on alumina as the catalyst, substantially identical results were obtained.

As noted in the above examples, considerable quantities of benzene, monochlorobenzene and the 1,2- and 1,4-dichlorobenzene isomers are obtained in the process of this invention. If a more complete utilization of the trichlorobenzene feed in the conversion to the 1,3-dichlorobenzene isomer is desired, it is possible to combine this hydrogenolysis process with a chlorination operation. In this combined operation the above reaction by-products can be chlorinated to form trichlorobenzene which can then be subjected to a hydrogenolysis reaction to produce the desirable 1,3-dichlorobenzene.

It should be noted that feeds of either a pure isomer or isomeric mixtures of trichlorobenzenes are suitable for this process. The 1,3,5-trichlorobenzene isomer, however, when employed in similar examples as given above, generally produces a dichlorobenzene product consisting essentially of the 1,3-dichlorobenzene isomer. The other two trichlorobenzene isomers, i.e. the 1,2,3- and the 1,2,4- isomers, react with hydrogen to form an isomeric mixture of all three dichlorobenzene isomers generally consisting of at least about 15 percent of the 1,3-dichlorobenzene isomer.

When temperatures as low as 300° C. and as high as 500° C. are employed in the above examples, similar results are obtained.

As noted above, the present invention provides an improved process for the manufacture of the valuable and heretofore difficultly obtainable 1,3 - dichlorobenzene from relatively plentiful and inexpensive trichlorobenzene. An isomeric mixture of dichlorobenzenes containing a large proportion of the 1,3-dichlorobenzene isomer is obtained when trichlorobenzene is contacted with hydrogen at temperatures above about 300° C. and in the presence of a hydrogenolysis catalyst. This process is extremely efficient and economical and lends itself to combination with a chlorination step to convert the other dichlorobenzene isomers and the lower chlorinated benzenes to trichlorobenzene. The latter compound can thereafter be reacted to produce a dichlorobenzene product containing a large proportion of the 1,3-dichlorobenzene isomer which can be separated and recovered from the isomeric mixture. By these means substantially all of the trichlorobenzene or lower chlorinated benzene compounds can be converted to 1,3-dichlorobenzene.

This application is a division of our application Serial No. 462,368, filed October 14, 1954, and now abandoned.

We claim:

1. The process of preparing metadichlorobenzene which comprises reacting trichlorobenzene with from 0.3 to 1.0 moles of hydrogen per mole of trichlorobenzene in the presence of a hydrogenation catalyst selected from the group consisting of molybdenum oxide, chromium oxide, and nickel chloride.

2. The process of claim 1 wherein the catalyst is supported on a carrier.

References Cited in the file of this patent

UNITED STATES PATENTS 2,866,828   Crowder et al. _____ Dec. 30, 1958